US012067299B2

(12) United States Patent
Braun et al.

(10) Patent No.: US 12,067,299 B2
(45) Date of Patent: Aug. 20, 2024

(54) MULTI-DRIVE USAGE BASED ON SINGLE PAIR ETHERNET

(71) Applicant: ROCKWELL AUTOMATION TECHNOLOGIES, INC., Mayfield Heights, OH (US)

(72) Inventors: Scott D. Braun, Menomonee Falls, WI (US); Todd A. Wiese, Hubertus, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 228 days.

(21) Appl. No.: 17/484,900

(22) Filed: Sep. 24, 2021

(65) Prior Publication Data
US 2023/0100475 A1 Mar. 30, 2023

(51) Int. Cl.
*G06F 3/06* (2006.01)
*H04L 12/10* (2006.01)
*H04L 12/66* (2006.01)

(52) U.S. Cl.
CPC ............ *G06F 3/067* (2013.01); *G06F 3/0604* (2013.01); *G06F 3/0655* (2013.01); *H04L 12/10* (2013.01); *H04L 12/66* (2013.01)

(58) Field of Classification Search
CPC ...... G06F 3/0604; G06F 3/0655; G06F 3/067; H04L 12/10; H04L 12/40182; H04L 12/40189; H04L 12/4625; H04L 12/66
See application file for complete search history.

(56) References Cited

U.S. PATENT DOCUMENTS

| | | | |
|---|---|---|---|
| 7,082,485 B2 | 7/2006 | Ellerbrock et al. | |
| 7,558,846 B2 | 7/2009 | Gu | |
| 7,660,889 B2 | 2/2010 | Gotesdyner | |
| 7,949,721 B2 | 5/2011 | Burrow et al. | |
| 8,359,397 B2 | 1/2013 | Traversat | |
| 8,582,469 B2 | 11/2013 | Rosenberg | |
| 8,931,101 B2 | 1/2015 | Saluda | |
| 9,037,673 B2 | 5/2015 | Horr | |
| 9,141,792 B2 | 9/2015 | Saluda | |
| 9,143,944 B2 | 9/2015 | Gong | |
| 9,294,562 B2 | 3/2016 | Gong | |
| 9,696,704 B2 | 7/2017 | Xu et al. | |
| 10,296,483 B2 * | 5/2019 | Vogt | H04L 12/40189 |

(Continued)

FOREIGN PATENT DOCUMENTS

| | | |
|---|---|---|
| KR | 20100034395 A | 4/2010 |
| WO | 2018018820 A1 | 2/2018 |
| WO | WO-2022013371 A1 * | 1/2022 |

OTHER PUBLICATIONS

Bliefert, "Field Device and Method for Integrating A Field Device," English Machine Translation of Bliefert (WO 2022/013371 A1), Clarivate Analytics, pp. 1-12 (Year: 2023).*

(Continued)

*Primary Examiner* — Marcus Smith
*Assistant Examiner* — Kai Chang
(74) *Attorney, Agent, or Firm* — Fletcher Yoder, P.C.

(57) ABSTRACT

A system includes drives that are communicatively coupled to a gateway communication device via single pair Ethernet (SPE) conductors. The gateway communication device may operate as router or a scanner to facilitate communication between the drives and components of an industrial automation system that are accessible via an Ethernet network.

18 Claims, 7 Drawing Sheets

(56) References Cited

U.S. PATENT DOCUMENTS

| | | | |
|---|---|---|---|
| 10,454,814 B2 | 10/2019 | Brissette et al. | |
| 11,036,209 B2 | 6/2021 | Xu | |
| 2002/0131446 A1* | 9/2002 | Metcalf, III | H04L 12/4625 |
| | | | 370/465 |
| 2005/0007964 A1 | 1/2005 | Falco | |
| 2006/0047778 A1 | 3/2006 | Adams et al. | |
| 2006/0224748 A1 | 10/2006 | Gupta | |
| 2009/0254639 A1 | 10/2009 | Manchester | |
| 2010/0064024 A1 | 3/2010 | Horr | |
| 2010/0153771 A1 | 6/2010 | Gordon et al. | |
| 2012/0260127 A1* | 10/2012 | Jibbe | G06F 11/2092 |
| | | | 714/E11.089 |
| 2013/0086195 A1* | 4/2013 | Hiniker | H04L 61/106 |
| | | | 709/208 |
| 2014/0101337 A1* | 4/2014 | Toth | H04L 69/18 |
| | | | 709/244 |
| 2014/0137246 A1 | 5/2014 | Saluda | |
| 2014/0325194 A1 | 10/2014 | Brindle | |
| 2014/0369179 A1* | 12/2014 | Ueda | H04L 12/66 |
| | | | 370/392 |
| 2016/0050116 A1 | 2/2016 | Sheshadri | |
| 2017/0070362 A1* | 3/2017 | Tappeiner | G05B 11/01 |
| 2017/0078382 A1 | 3/2017 | Prakash et al. | |
| 2018/0107609 A1* | 4/2018 | Kumar Kn | G06F 8/61 |
| 2018/0237040 A1 | 8/2018 | Mong et al. | |
| 2019/0250910 A1 | 8/2019 | Yu | |
| 2019/0342296 A1 | 11/2019 | Anandam | |
| 2019/0342328 A1 | 11/2019 | Rivner | |
| 2020/0235780 A1* | 7/2020 | Bains | H04B 3/23 |
| 2020/0393891 A1 | 12/2020 | Baggett et al. | |
| 2022/0103449 A1* | 3/2022 | Guru | H02P 29/00 |
| 2022/0141290 A1* | 5/2022 | Chelmecki | H04L 67/55 |
| | | | 709/220 |
| 2023/0093802 A1* | 3/2023 | Braun | G05B 9/02 |
| | | | 700/28 |
| 2023/0096101 A1* | 3/2023 | Braun | G05B 19/4185 |
| | | | 370/351 |
| 2023/0106122 A1* | 4/2023 | Peterson | G05B 19/418 |
| | | | 700/19 |

OTHER PUBLICATIONS

Extended European Search Report for EP Application No. 20191255.7 mailed Apr. 16, 2021, 15 pages.
Partial European Search Report for EP Application No. 20191255.7 mailed Jan. 28, 2021, 14 pages.
Allen Bradley; "Controllogix Peer-to-Peer I/0;" May 2012; 2 pages.
Extended European Search Report for Application No. 22196585.8 mailed Feb. 3, 2023, 8 pages.

* cited by examiner

MULTI-DRIVE USAGE BASED ON SINGLE PAIR ETHERNET

CROSS-REFERENCE TO RELATED APPLICATIONS

This application is related to co-pending U.S. patent application Ser. No. 17/484,966, entitled "OPTION CARD FOR FACILITATING COMMUNICATION IN DRIVE APPLICATIONS," filed Sep. 24, 2021, and co-pending U.S. patent application Ser. No. 17/484,948, entitled "EMPLOYING SINGLE PAIR ETHERNET FOR ZONED SAFETY IN DRIVE APPLICATIONS," filed Sep. 24, 2021, each of which are incorporated herein by reference for all purposes.

BACKGROUND

This disclosure relates generally to systems and methods for using multiple drives to control industrial automation devices within an industrial automation system. More particularly, embodiments of the present disclosure are related to efficiently connecting multiple drives to a communication network (e.g., Ethernet network).

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Industrial automation systems may include automation control and monitoring systems. The automation control and monitoring systems may monitor statuses and/or receive information from a wide range of devices, such as valves, electric motors, a wide range of sensors, other suitable monitoring devices, or the like. One or more components of the automation control and monitoring systems, such as programming terminals, automation controllers (e.g., programmable logic controller (PLC) or a programmable logic device (PLD)), input/output (I/O) modules, communication networks, human-machine interface (HMI) terminals, and the like, may use the statuses and/or received information to provide alerts to operators to change or adjust operation of one or more devices of the industrial automation system (e.g., such as adjusting operation of one or more actuators), to manage the industrial automation system, or the like.

The components (e.g., supervisory control system) described above may also send data and/or commands to one or more drives within a control cabinet of the of the industrial automation system. The drives may be connected to a communication network such as an Ethernet network (e.g., Ethernet/IP), such that the control system of each drive may receive the statuses and/or information from the wide range of devices and use the statuses and/or information to make control decisions. An example of a control decision is determining whether to slow or halt operation of a motor. In response to receiving the control decision from some component or generating the control decision based on receiving data from some component, a drive associated with the motor may slow or halt operation of the motor according to the control decision. However, connecting each drive directly to a communication network may result in increased cost within each product, require a bundle of cables to route and manage, and require a network switch for each product to connect into which may be cumbersome and not ideal to the customer's needs.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system comprises a plurality of drives that control one or more operations of a plurality of load devices and a gateway communication device. The gateway communication device is communicatively coupled to the plurality of drives via a first communication network accessible via single pair Ethernet (SPE) conductors and communicatively coupled to one or more components accessible via a second communication network. The gateway communication device may receive a data packet from one or more components via the second communication network, determine how the format of the data packet corresponds to the first communication network, and identify one or more drives of the plurality of drives based on the data packet to route or translate that data packet to. If the data packet includes a format that corresponds to the second communication network, the gateway communication device may retrieve one or more data properties specified by the data packet and associated with the one or more drives on the first communications network via a memory component. As such, when the data packet is associated with the first communication network, the gateway communication device may retrieve the one or more data properties directly from the one or more drives. The gateway communication device may also generate an additional data packet based on the one or more data properties and transmit the additional data packet to the one or more components via the second communication network.

In a further embodiment, a system includes a plurality of drives that control one or more operations of a plurality of load devices and a gateway communication device. The gateway communication device is communicatively coupled to the plurality of drives via a first communication network accessible via single pair Ethernet (SPE) conductors and communicatively coupled to one or more components accessible via a second communication network. The gateway communication device may receive a data packet from the one or more components via the second communication network and identify one or more drives of the plurality of drives based on the data packet. The gateway communication device may also determine whether one or more data properties specified by the data packet and associated with the one or more drives are stored in a memory component in response to determining that the data packet is incompatible with the first communication network. The memory component may be periodically updated to include scanned information for each of the plurality of drives acquired via the first communication network. The gateway communication device may retrieve the one or more data properties from the memory component in response to determining that the one or more data properties are stored in the memory component. Further, the gateway communication device may generate an additional data packet based on the one or more data properties and transmit the additional data packet to the one or more components via the second communication network.

In an additional embodiment, a method includes a processor receiving a data packet from one or more components via a first communication network and determining whether a format of the data packet corresponds to the first communication network or a second communication network associated with a plurality of drives. The processor may identify one or more drives of the plurality of drives based on the data packet. In response to determining that the data packet is associated with the first communication network, the processor may retrieve one or more data properties specified by the data packet and associated with the one or more drives via a memory component. In response to determining that the data packet is associated with the second communication network, the processor may retrieve the one or more data properties directly from the one or more drives. Further, the processor may generate an additional data packet based on the one or more data properties and transmit the additional data packet to the one or more components via the first communication network.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
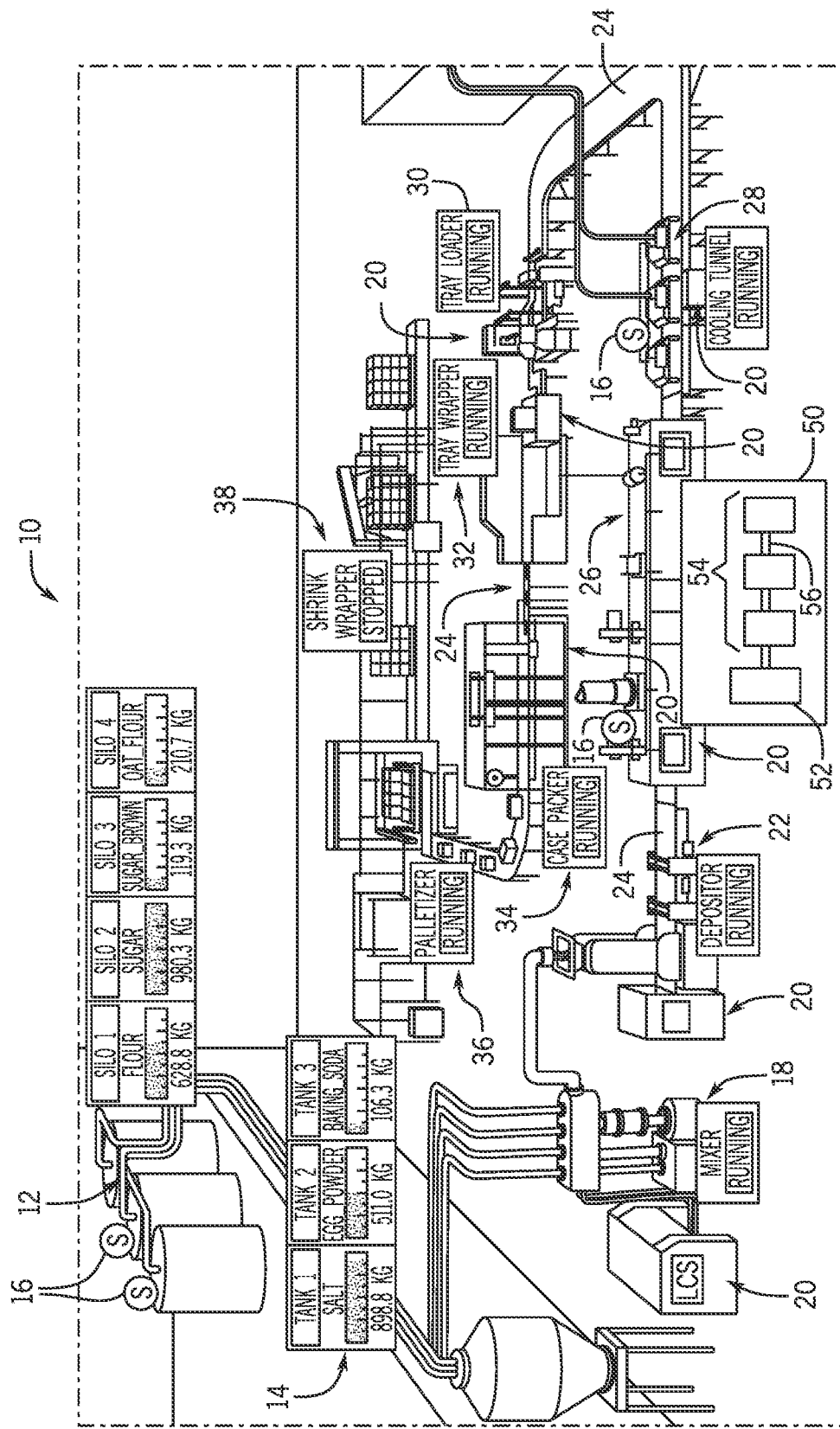
FIG. 1 illustrates an example industrial automation system employed by a food manufacturer, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification.

Industrial automation systems may be used in various contexts, such as a manufacturing plant, a resource extraction system, a hydrocarbon extraction site, a chemical refinery facility, an industrial plant, a power generation system, a mining system, a brewery, or the like. For example, in a resource extraction system context, a drive associated with a control system may control load and position of a rod pump to perform an oil extraction process. Although examples are provided with regard to specific contexts, one of ordinary skill in the art will recognize that these examples are not intended to be limiting and that the techniques described herein can be used with any suitable context.

To improve operation of industrial automation systems, components of the industrial automation system (e.g., supervisory control system) may monitor performance of one or more devices (e.g., machines, sensors) with respect to the industrial automation process as a whole. Statuses and/or information from the one or more components (e.g., supervisory control system) may be transmitted to respective control systems of drives associated with the one or more devices via an Ethernet network. Respective control systems of the drives may use the statuses and/or information to make control decisions related to the one or more devices controlled by or coupled to the drive. As mentioned above, each drive may be housed in a control cabinet associated with the industrial automation system, and each drive may include a control system to control operations of respective components (e.g., load devices, motor). In some embodiments, the control system of each drive and components such as the supervisory control system may have similar processing capabilities. To enable the control system to receive statuses and/or information from the one or more components, each drive may be connected to an Ethernet network (e.g., subnet, Ethernet/IP). In some cases, each drive may be connected to the Ethernet network via separate Ethernet cables. However, wiring each drive to the Ethernet network via an Ethernet cable may be cumbersome, cost inefficient, and result in a bundle of Ethernet cables, which may be difficult to maintain.

In previous solutions, multiple drives may each be connected to the Ethernet network via a drive serial interface (DSI) cable. A drive serial interface (DSI) cable serves to connect each of the multiple drives to the Ethernet network without having to wire each drive to the Ethernet network with a separate Ethernet cable. However, the drive serial interface (DSI) cable is limited to connecting up to certain number (e.g., 5) drives, including a gateway communication device, to the Ethernet network due to bandwidth limitations of the DSI cable. As used herein, a gateway communication device may be a communication device that is directly (e.g., no intervening components) connected to the Ethernet network.

Further, a second Ethernet network connected to the gateway communication device may be any Ethernet based communication network including industrial networks such as ProfiNet, Modbus TCP, BacNet/IP, EtherCAT, or EtherNet/IP. In this embodiment, the drives may be communicatively coupled to each other and the gateway communication device via a first communication network (subnet, SPE Ethernet/IP), and the gateway communication device may be communicatively coupled to the components (e.g., supervisory control system) of the industrial automation system via a second communication network that utilizes a different Ethernet protocol from the first communication network (e.g., ProfiNet, Modbus TCP, BacNet/IP, EtherCAT). In such case and as described in greater detail below, the gateway communication device may operate as a scanner to facilitate communications between devices that are part of different networks (e.g., between Ethernet/IP and ProfiNet). For example, the gateway communication device may receive a data packet from components of the industrial automation system. If the data packet is in a format that is incompatible with subnet (e.g., Ethernet/IP), then the gateway communication device may operate as a scanner and determine destination drives(s) based on parsing the data packet. In some embodiments, the gateway communication device may retrieve data properties specified by the parsed data packet and associated with the destination drive(s) from a memory component that includes scanned information corresponding to each drive on the subnet. In other embodiments, if the data properties specified by the parsed data packet are not stored in the memory component, then the gateway communication device may transmit a message to the destination drive(s) to retrieve the data properties specified by the parsed data packed from the destination drive(s). The gateway communication device may then transmit the data properties to the components (e.g., supervisory control system) of the industrial automation system by repackaging the data properties in a format suitable for transmission via an Ethernet network different from the subnet, such as ProfiNet or Modbus TCP. However, if the gateway communication device receives the data packet in a form compatible with the subnet (e.g., Ethernet/IP), then the gateway communication device may operate as a router and transmit the data packet directly to destination drives(s) via single pair Ethernet (SPE) conductors.

In addition to limiting the number of drives that can be connected to the Ethernet network, the previous solutions using the drive serial interface (DSI) had limited bandwidth, a transmission speed of 19.2K baud, and a drive update rate as slow as 200 milliseconds. Further, while each drive may have included an interface that supports connection to the drive serial interface (DSI), the gateway communication device may also include a separate Ethernet interface that supports connection to the Ethernet network.

With this in mind, it may be desirable to effectively connect multiple drives to the Ethernet network while reducing number of wires and overall cost of the control cabinet, increasing transmission speed and drive update rate, and the like. Accordingly, the present disclosure provides techniques for connecting the gateway communication device to other drives using single pair Ethernet (SPE) conductors.

As used herein, single pair Ethernet (SPE) conductors may include a single pair of twisted wire for transmitting and receiving data. Non-limiting examples of single pair Ethernet (SPE) conductors include single pair Ethernet (SPE) cables, single pair Ethernet (SPE) wires, single pair Ethernet (SPE) traces, and single pair Ethernet (SPE) bars. In some embodiments, a network ribbon cable (e.g., five-line cable, six-line cable, seven-line cable) may include the single pair Ethernet (SPE) conductors. The single pair Ethernet (SPE) conductors may be used to couple the drives to the Ethernet network and communicatively couple each drive to each other and to the Ethernet network via the gateway communication device. In some embodiments, the single pair Ethernet (SPE) conductors may connect up to a certain number (e.g., 40-50) of drives (e.g., drive control systems) based on the bandwidth provided via the single pair Ethernet (SPE) conductors. While eliminating superfluous wiring, the single pair Ethernet (SPE) conductors within the network ribbon cable may have a transmission update rate (e.g., transmission update rate between 10 and 20 milliseconds) that is faster as compared to the previous solutions employing drive serial interface (DSI).

Each drive may include an interface (e.g., vampire tap, device that clamps onto cable, 10BASE5 cabling) that supports connection to the single pair Ethernet (SPE) cable. The gateway communication device may include an interface that supports a direct connection to the Ethernet network and supports connections to neighboring drives via the single pair Ethernet (SPE) conductors. Unlike the previous solutions employing drive serial interface (DSI), in addition to drives, the single pair Ethernet (SPE) conductors may also connect to other control cabinet devices (e.g., push buttons, pilot lights, contactors, switches, starters, input/output modules) that may be capable of interacting with the drives. By connecting drives to the Ethernet network via a single pair Ethernet (SPE) conductors, the number of drives that can be connected to the Ethernet network the transmission speed, and drive update frequency increase.

By way of introduction, FIG. 1 illustrates an example industrial automation system 10 employed by a food manufacturer in which the present embodiments may be implemented. It should be noted that although the example industrial automation system 10 of FIG. 1 is directed at a food manufacturer, the present embodiments described herein may be employed within any suitable industry, such as automotive, IT, mining, hydrocarbon production, manufacturing, and the like. The following brief description of the example industrial automation system 10 employed by the food manufacturer is provided herein to help facilitate a more comprehensive understanding of how the embodiments described herein may be applied to components and a manufacturing application system to significantly improve the operations of the respective industrial automation system. As such, the embodiments described herein should not be limited to be applied to the example depicted in FIG. 1.

Referring now to FIG. 1, the example industrial automation system 10 for a food manufacturer may include silos 12 and tanks 14. The silos 12 and the tanks 14 may store different types of raw material, such as grains, salt, yeast, sweeteners, flavoring agents, coloring agents, vitamins, minerals, and preservatives. In some embodiments, sensors 16 may be positioned within or around the silos 12, the tanks 14, or other suitable locations within the industrial automation system 10 to measure certain properties, such as temperature, mass, volume, pressure, humidity, and the like.

The raw materials may be provided to a mixer 18, which may mix the raw materials together according to a specified ratio. The mixer 18 and other machines in the industrial automation system 10 may employ certain industrial automation devices 20 to control the operations of the mixer 18 and other machines. The industrial automation devices 20 may include controllers, input/output (I/O) modules, motor control centers, motors, human machine interfaces (HMIs), operator interfaces, contactors, starters, sensors 16, actuators, conveyors, drives, relays, protection devices, switchgear, compressors, firewall, network switches (e.g., Ethernet switches, modular-managed, fixed-managed, service-router, industrial, unmanaged, etc.) and the like. The industrial automation devices 20, the mixer 18, and other machines are examples of components in the industrial automation system 10.

The mixer 18 may provide a mixed compound to a depositor 22, which may deposit a certain amount of the mixed compound onto conveyor 24. The depositor 22 may deposit the mixed compound on the conveyor 24 according to a shape and amount that may be specified to a control system for the depositor 22. The conveyor 24 may be any suitable conveyor system that transports items to various types of machinery across the industrial automation system 10. For example, the conveyor 24 may transport deposited material from the depositor 22 to an oven 26, which may bake the deposited material. The baked material may be transported to a cooling tunnel 28 to cool the baked material, such that the cooled material may be transported to a tray loader 30 via the conveyor 24. The tray loader 30 may include machinery that receives a certain amount of the cooled material for packaging. By way of example, the tray loader 30 may receive 25 ounces of the cooled material, which may correspond to an amount of cereal provided in a cereal box.

A tray wrapper 32 may receive a collected amount of cooled material from the tray loader 30 into a bag, which may be sealed. The tray wrapper 32 may receive the collected amount of cooled material in a bag and seal the bag using appropriate machinery. The conveyor 24 may transport the bagged material to case packer 34, which may package the bagged material into a box. The boxes may be transported to a palletizer 36, which may stack a certain number of boxes on a pallet that may be lifted using a forklift or the like. The stacked boxes may then be transported to a shrink wrapper 38, which may wrap the stacked boxes with shrink-wrap to keep the stacked boxes together while on the pallet. The shrink-wrapped boxes may then be transported to storage or the like via a forklift or other suitable transport vehicle.

To perform the operations of each of the devices in the example industrial automation system 10, the industrial automation devices 20 may be used to provide power to the machinery used to perform certain tasks, provide protection to the machinery from electrical surges, prevent injuries from occurring with human operators in the industrial automation system 10, monitor the operations of the respective device, communicate data regarding the respective device to a supervisory control system, and the like. In some embodiments, each industrial automation device 20 or a group of industrial automation devices 20 may be controlled using a local control system (e.g., associated with a drive). The local control system may receive data regarding the operation of the respective industrial automation device, other industrial automation devices, user inputs, and other suitable inputs to control the operations of the respective industrial automation device(s) 20.

The local control system may have access to configuration data associated with the connected industrial automation devices (e.g., load device, motor). That is, the local control system may include memory or a storage component that stores information concerning the configuration of each industrial automation device 20 connected to it. In some embodiments, the information or configuration data may be populated or input by an operator at the time the respective industrial automation device 20 is installed. Additionally, the local control system may query the connected industrial automation device 20 to retrieve configuration data, such as model number, serial number, firmware revision, assembly profile, and the like. In some embodiments, the supervisory control system may collect configuration data from multiple local control systems and store the information in a suitable memory or storage component.

As mentioned above, the industrial automation devices 20 may be controlled using a local control system. The local control system may be disposed within a respective drive 54. One or more drives 54 may be disposed in a control cabinet 50 of the industrial automation system 10. Along with the one or more drives 54, the control cabinet 50 may house one or more gateway communication device 52 of the industrial automation system 10. In some embodiments, as illustrated in FIG. 1, the one or more gateway communication devices 52 may be enclosed in a different housing than the one or more drives 54. For example, each gateway communication device 52 may be enclosed in a separate housing than each drive 54. In other embodiments, at least one gateway communication device 52 and at least one drive 54 may integrated together in a common housing.

The gateway communication device 52 may receive data (e.g., status information) from components (e.g., supervisory control system) of the industrial automation system 10 via a communication network (e.g., Ethernet network) and facilitate routing of the data to a respective destination drive via single pair Ethernet (SPE) conductors 56. In some embodiments, the gateway communication device 52 may be a drive with the ability to interface with the communication network. Based on receiving data from components (e.g., supervisory control system) of the industrial automation system 10 via the gateway communication device 52, a respective drive 54 may make a control decision. In some embodiments, the components such as the supervisory control system may make the control decision, and the gateway communication device 52 may transmit the data related to the control decision to a respective drive 54. For example, the drive 54 may control torque, power, speed, direction, or any suitable operation of a respective industrial automation device 20 (e.g., load device). That is, the drive 54 may include drive circuitry, such as switches (e.g., diodes, IGBTs, thyristors), that convert single-phase or multi-phase alternating current (AC) voltage into a controllable AC voltage that may be used to perform control operations for a load device, such as a motor. In addition, the gateway communication device 52 may receive data from the drives 54 via the single pair Ethernet (SPE) conductors 56 and facilitate transmission of the data to components (e.g., supervisory control system) via the communication network (e.g., Ethernet network).

Referring back to the gateway communication device 52, in some embodiments, the gateway communication device 52 may include a communication component, a processor, a memory, a storage unit, input/output (I/O) ports, a display (e.g., HMI), and other computing components. The communication component may be a wireless or wired communication component that may facilitate communication between the equipment and other communication capable devices. The processor may include any suitable single-core or multi-core processor that performs certain operations such as parsing data packets, performing certain computing commands, and other operations commonly performed by processors. In addition, the drives 54 may also include a control system (e.g., a local control system) that has similar components as described above with reference to the gateway communication device 52 to perform processing and communication operations.

Figure 2:
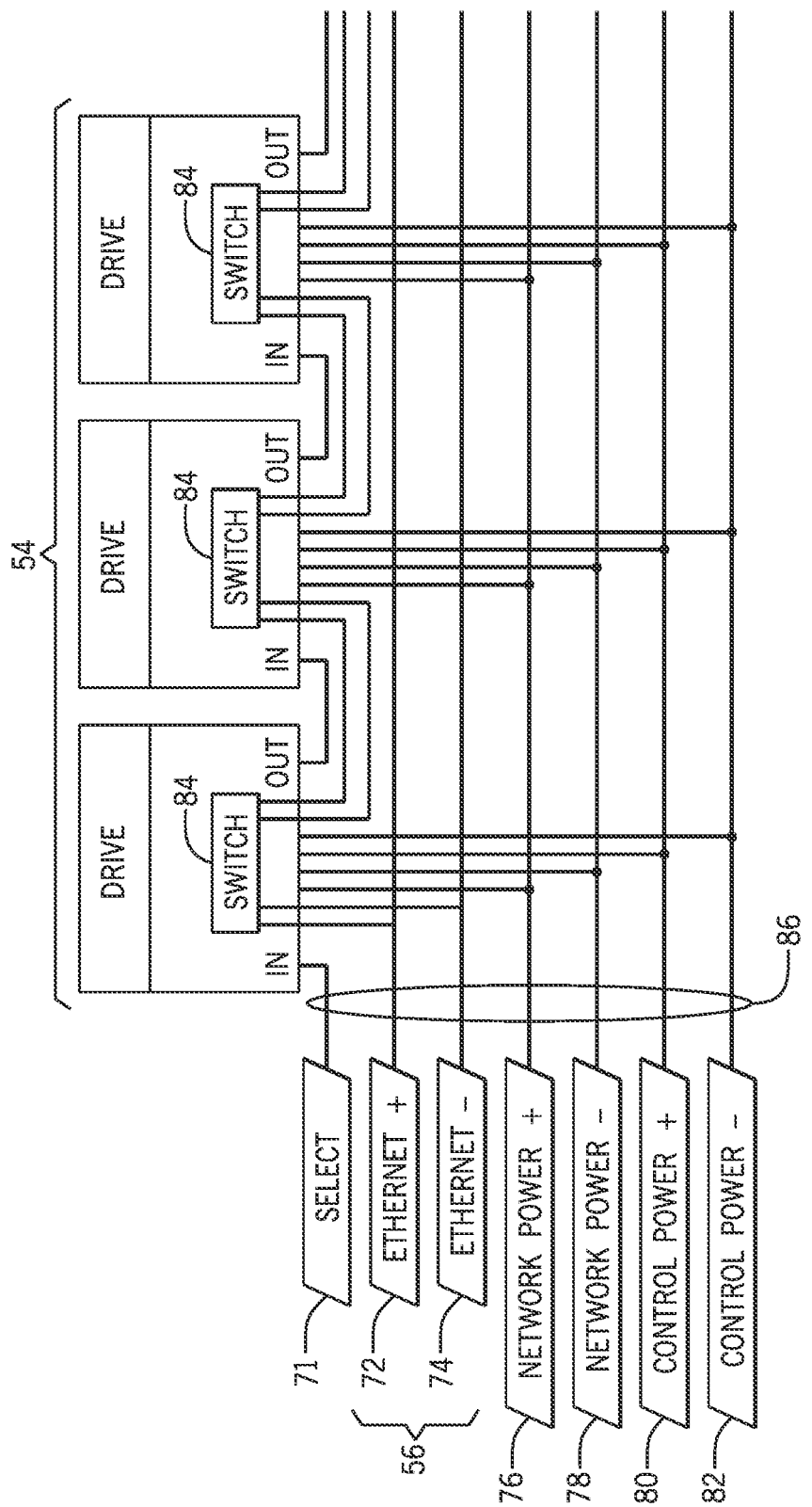
FIG. 2 illustrates an example network ribbon cable used to connect drives of the industrial automation system of FIG. 1, in accordance with an embodiment of the present disclosure.

To prevent latency issues, increase the transmission speed, the drive update rate, the number of drives 54 that can be connected to the Ethernet network 62, and provide better connectivity properties between drives 54, the single pair Ethernet (SPE) conductors 56 or a subnet ribbon cable (e.g., ribbon cable having the single pair Ethernet (SPE) conductors 56) may be used to connect each drive 54 to the Ethernet network 62. Accordingly, FIG. 2 illustrates an example infrastructure, such as a subnet ribbon cable 70, that may be used to perform the embodiments discussed herein. As used herein, the subnet ribbon cable 70 may include a series of single conductor wires placed parallel to each other and molded together. The subnet ribbon cable 70 may receive and transmit data between drives 54 and/or between the gateway communication device 52 and drives 54. A subnet (e.g., Ethernet/IP) is a portion of the communication network logically designated for transmitting messages between two or more drives 54 and/or between a drive 54 and another component.

Each drive 54 may be communicatively coupled to other components of the industrial automation system 10 via a communication network (e.g., Ethernet network 62) and/or sub networks (e.g., sub-nets) of the communication network. Keeping this in mind, in some embodiments, the subnet ribbon cable 70 may include a select signal 71, network power positive signal 76 and negative signal 78, an Ethernet positive signal 72 and negative signal 74 (e.g., the single pair Ethernet (SPE) conductors 56), and a control power positive signal 80 and negative signal 82. The select signal 71 may serve to select or access one or more drives 54 connected to the gateway communication device 52. For example, the gateway communication device may send a select signal 71 to one of the drives 54 to identify the drive 54, provide an IP address for the drive 54, or the like. That is, when the select signal 51 is provided to a particular drive 54, the particular drive 54 may be assigned an internet protocol (IP) address that serves as identification for the particular drive 54. As described in greater detail below, the gateway communication device 52 may identify each drive from the drives 54 and respective data properties for scanning purposes.

Referring again to the subnet ribbon cable 70, the network power positive signal 76 and negative signal 78 may deliver power to network components of each of the drives 54 and components (e.g., motor) from a power supply or tapped connection off of another electrical coupling. The Ethernet positive signal 72 and negative signal 74 (e.g., the single pair Ethernet (SPE) conductors 56) may provide network communication functionality using a single pair Ethernet (SPE) protocol. In some embodiments, the Ethernet positive signal 72 and negative signal 74 may be a part of a bus system. The control power positive signal 80 and negative signal 82 may power an actuator (e.g., a contactor coil) or other control mechanism for at least one of the drives 54. An actuator may execute a control operation for the drive 54. For example, a control operation of the drive 54 may include closing a contactor to connect a motor to a power source, the drive 54, or the like.

It can be appreciated that any suitable number of pins and lines may be used to form the subnet ribbon cable 70 (e.g., five-line ribbon cable, seven-line ribbon cable). As illustrated in FIG. 2, the subnet ribbon cable 70 may be a six-line cable that uses eight-pin connector circuitry to couple the drives 54 to the communication network (e.g., Ethernet network 62) and each other.

In some embodiments, one or more of the drives 54 may be connected to the subnet ribbon cable 70 (e.g., having the single pair Ethernet (SPE) conductors 56) via respective vampire taps. Further, Ethernet signals may transmit through respective switches 84 of the drives 54 that may control a timing used to transmit messages between the drives 54 and/or between the gateway communication device 52 and components or the industrial automation system 10 via Ethernet communicative couplings.

Figure 3:
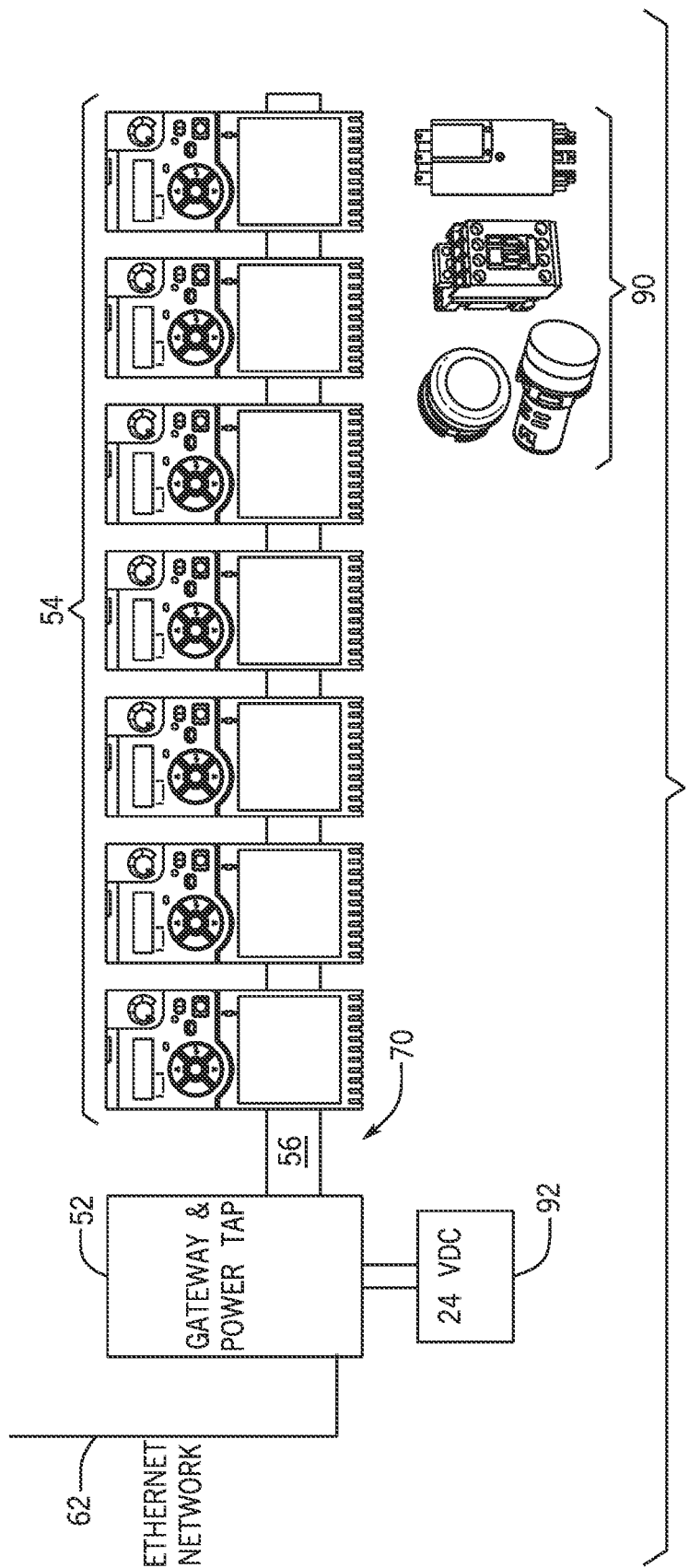
FIG. 3 illustrates drives of the industrial automation system of FIG. 1 connected to an Ethernet network via single pair Ethernet (SPE) conductors, in accordance with an embodiment of the present disclosure.

With the preceding in mind, FIG. 3 illustrates multiple drives 54 connected to the Ethernet network 62 via the subnet ribbon cable 70 having the single pair Ethernet (SPE) conductors 56, in accordance with an embodiment of the present disclosure. As mentioned above, the single pair Ethernet (SPE) conductors 56 (e.g., Ethernet positive and negative signals 72 and 74) may communicatively couple each drive 54, including the gateway communication device 52, to the Ethernet network 62. In some embodiments, the single pair Ethernet (SPE) conductors 56 may connect up to any suitable number of drives 54 (e.g., between 40 and 50 drives). That is, the single pair Ethernet (SPE) conductors 56 may facilitate a transmission speed (e.g., transmission speed between 10 and 20 milliseconds) when connected to a certain number of drives 54.

As mentioned above, the drives 54 may be communicatively coupled to each other and the gateway communication device 52 via a subnet (e.g., Ethernet/IP) using the single pair Ethernet (SPE) conductors 56. In some embodiments, the gateway communication device 52 may also be communicatively coupled to components (e.g., supervisory control system) via the subnet (e.g., Ethernet/IP). In other embodiments, the gateway communication device 52 may be communicatively coupled to the components (e.g., supervisory control system) via an Ethernet network 62 (e.g., ProfiNet, Modbus TCP, BacNet/IP) different from the subnet (e.g., Ethernet/IP). As mentioned above, the Ethernet network 62 may be any Ethernet based communication network including industrial networks such as ProfiNet, Modbus TCP, BacNet/IP, subnet (e.g., Ethernet/IP).

When Ethernet network 62 (e.g., ProfiNet) used by certain components to communicate with the gateway communication device 52 is different than the communication network (e.g., Ethernet/IP) that the gateway communication device 52 uses to communicate with the drives 54, the gateway communication device 52 may operate as a scanner or a protocol translator to transmit data between the components (e.g., supervisory control system) and destination drives 54. By way of example, the gateway communication device 52 may cyclically communicate with a device that it controls, such as the drive 54. The gateway communication device 52 may, for instance, send control data to the drive 54, and the drive 54 may return status data associated with the control data. The gateway communication device 52 may perform this operation repetitively for multiple drives 54. This repetitive process may be referred to as scanning.

With this in mind, the gateway communication device 52 may receive a data packet from the components via the Ethernet network 62. If the data packet is not in a form compatible with the subnet or communication network that the gateway communication device 52 uses to communicate with the drives 54, the gateway communication device may operate as a scanner by parsing the received data packet and identifying the destination drive(s) 54 of the data packet. That is, the gateway communication device may retrieve data properties specified by the parsed data packet and associated with the destination drive(s) from a memory component that includes scanned information corresponding to each drive on the subnet. In other embodiments, if the data properties specified by the parsed data packet are not stored in the memory component, then the gateway communication device may transmit a message to the destination drive(s) to retrieve the data properties specified by the parsed data packed from the destination drive(s). The data properties may also be transmitted to the components of the industrial automation system by repackaging the data properties in a form suitable for transmission via the Ethernet network 62 that is different from the subnet.

When the Ethernet network 62 (e.g., Ethernet/IP) used to couple the gateway communication device 52 and the components is similar to the Ethernet network 62 (e.g., Ethernet/IP) used to couple the gateway communication device 52 to the drives 54, the gateway communication device 52 may operate as a router to transmit data between the components (e.g., supervisory control system) and the destination drives 54. For example, the gateway communication device 52 may receive a data packet from the components via the Ethernet network 62. If the data packet is in a form compatible with subnet (e.g., Ethernet/IP), then the gateway communication device 52 may directly transmit the data packet to destination drives(s) of the drives 54 connected to the subnet (e.g., Ethernet/IP) using the single pair Ethernet (SPE) conductors 56.

To use the single pair Ethernet (SPE) conductors 56, each drive 54 may include an interface that supports connection to the single pair Ethernet (SPE) conductors 56. In addition, the gateway communication device 52 may include an interface that supports connection to the Ethernet network 62 and neighboring drives 54 via the single pair Ethernet (SPE) conductors 56.

For example, the gateway communication device 52 may include communication components that couple to the Ethernet network 62. The gateway communication device 52 may include communication components that couple to the single pair Ethernet (SPE) conductors 56. In additional and/or alternative embodiments, the gate may include communication components that couple to three-phase power source. Such communication components may include ports, modems, network switches, and the like. In some embodiments, a drive 54 may include communication components such as a switch that couple to the single pair Ethernet (SPE) conductors 56. The drive 54, via the switch, that may receive single pair Ethernet (SPE) data via the single pair Ethernet (SPE) conductors 56 and forward the single pair Ethernet (SPE) data to another drive via additional single pair Ethernet (SPE) conductors.

In addition to the gateway communication device 52 and the drives 54, the single pair Ethernet (SPE) conductors 56 may also connect to other control cabinet devices 90 (e.g., push buttons, pilot lights, contactors, switches, starters, input/output devices) that may interact with the drives 54 or other components within the industrial automation system 10. In some embodiments, the other control cabinet devices 90 may provide data such as status information associated with industrial automation devices 20 (e.g., load devices) or user input that may be interpreted by a respective drive 54. The gateway communication device 52 may receive the data from the other control cabinet devices 90 via the single pair Ethernet (SPE) conductors 56. In some embodiments, the gateway communication device 52 (e.g., processor or control system of the gateway communication device 52) may generate control signal(s) based on the data. Based on receiving the data from the other control cabinet devices 90 via the single pair Ethernet (SPE) conductors 56, the gateway communication device 52 may send the data or the control signal(s) associated with the data to a processor or control system of a respective drive 54. The processor or control system may modify operation (e.g., output speed) associated with the drive 54 and corresponding industrial automation device 20 (e.g., load device). For example, the drive 54 such as a motor starter may power on a motor load in response to a command received from a control cabinet device 90 such as a start button. The start button may be an input device that enables an operator to provide control instructions (e.g., start or power on, stop or power off) to the motor starter. Another, control cabinet device 90, a status pilot light, may emit light in response to a message from the motor starter indicative of an operation of the motor load. Accordingly, each of the control cabinet devices 90 may provide messages to the drives 54, the gateway communication device 52, and/or the other components communicatively accessible via the Ethernet network 62.

In some embodiments, as illustrated in FIG. 3, the gateway communication device 52 may be coupled to a power supply (e.g., 24V DC power supply) to power the gateway communication device 52. By way of operation, the gateway communication device 52 may receive communications via the Ethernet network 62, and transmit the communications to the neighboring drives 54 via the single pair Ethernet (SPE) conductors 56. As such, the gateway communication device 52 serves to connect two similar networks and provide a routing function. For example, the gateway communication device 52 may receive data (e.g., status information related to industrial automation devices 20 such as load devices) from components (e.g., supervisory control system) of the industrial automation system 10 and/or user input from an operator via the Ethernet network 62.

As discussed above, the gateway communication device 52 may operate as a scanner and retrieve scanned information (e.g., information from registers, data points, information from input/output modules) related to each destination drive 54. With this in mind, the gateway communication component 52 may first initialize the drives 54 connected to the gateway communication component 52 via the subnet ribbon cable 70 and generate a table that stores the data that is periodically scanned or retrieved from the connected drives 54.

With this in mind, in some embodiments, the gateway communication device 52 may receive a command to identify a set of devices (e.g., drives 54) that may be present on a communication network (e.g., subnet) and communicatively coupled to the gateway communication device 52. The command may be received from a user input, components coupled to the Ethernet network 62, or any other suitable device. The command may be related to initializing the components communicatively coupled to the gateway communication device 52 via the subnet ribbon cable 70.

In response to receiving the command, the gateway communication device 52 may send the select signal 71 to a first device via the subnet ribbon cable 70. While the first device receives the select signal 71, the gateway communication device 52 may assign an IP address to the first device, identify data properties associated with input/output (IO) devices that are a part of the first device, and the like. The gateway communication device 52 may store the IP address and the data properties associated with the first device in a table or memory component. The gateway communication device 52 may then periodically query the first device while performing a scanning operation and periodically update the table to include status data (e.g., operational parameters, sensor data) for the data properties associated with the first device.

Non-limiting examples of the data properties may include information from data registers associated with the drive, data points, and information from input/output modules associated with the drive and available for scanning. As used herein, the input/output modules may communicatively couple the respective control systems of the drives 54 to components (e.g., input/output devices) of the industrial automation system 10. For example, the input/output modules may serve functions related to control and timing, data buffering, and the like between the control systems of the drives 54 and the input/output devices. The gateway communication device 52 may perform the same operation for each device of the set of devices connected to the gateway communication device 52 via the subnet ribbon cable 70 and populate the table for each connected device. As such, the gateway communication device 52 may initialize the scanning operation functions to periodically collect data from the connected devices.

Figure 4:
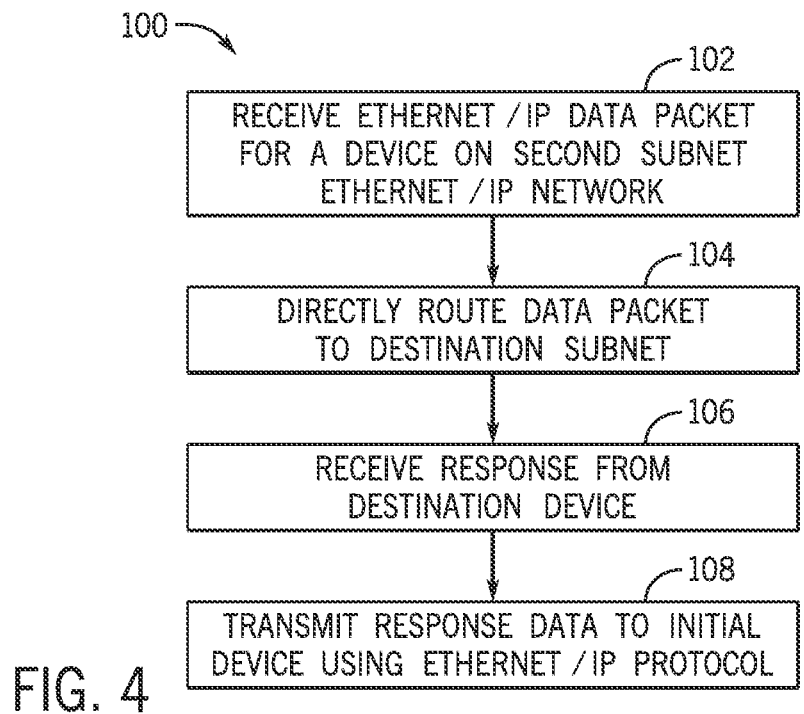
FIG. 4 is a flow chart of a process for directly routing data to and from the drives of the industrial automation system 10 via a gateway communication device, in accordance with an embodiment of the present disclosure.

As mentioned above, the gateway communication device 52 may operate as a scanner or a router to facilitate communication between components of the industrial automation system 10 and the drives 54 (or other devices coupled to the gateway communication device 52 via the subnet). Keeping this in mind, FIG. 4 is a flow chart of a process 100 for routing data transmission between the components of the industrial automation system 10 and the drives 54 via the gateway communication device 52. Although the following description of the process 100 will be discussed as being performed by the gateway communication device 52, it should be noted that any suitable computing component may perform the process 100. In addition, although the process 100 is described in a particular order, it should be noted that the process 100 may be performed in any suitable order.

At block 102, the gateway communication device 52 may receive a data packet from components (e.g., supervisory control system) that is present on the Ethernet network 62. The data packet may be an EtherNet/IP data packet that is directed to a devices that is present on a second subnet EtherNet/IP network accessible to the gateway communication device 52. The data packet may provide status information, performance attributes, status requests, data requests, data write operations, and other operations associated with the components, the industrial automation devices 20 (e.g., load devices, input/output devices), the drives 54, or any other suitable component communicatively coupled to the gateway communication device 52. For example, the gateway communication device 52 may receive data packets related to a requested speed, torque, power, and the like of a load device (e.g., motor) that is controlled by a respective drive 54 from the supervisory control system via the Ethernet network 62. The gateway communication device 52 may include one or more communication components (e.g., ports, modems, network switches) that couple to the Ethernet network 62 to receive the data packets from the supervisory control system.

At block 104, the gateway communication device 52 may directly route the data packet to the destination device on the second subnet EtherNet/IP network. In some embodiments, the gateway communication device 52 may first determine that a format of the data packet corresponds to the second subnet EtherNet/IP network associated with the drives 54. As mentioned above, when the Ethernet network 62 and the drives 54 coupled to the gateway communication device 52 operate using the same communication network (e.g., EtherNet/IP), the gateway communication device 52 may operate as router. As such, the gateway communication device 52 may directly (e.g., without intervening component) transmit the data packet to the destination drive(s) via the subnet ribbon cable 70 since the data packet is in a format that may be transmittable via the single pair Ethernet (SPE) conductors 56.

At block 106, the gateway communication device 52 may receive a response from the destination device or drive 54 that received the data packet routed via the second subnet network at block 104. That is, the destination device or the drives 54 may provide a response packet via the subnet network. At block 108, the gateway communication device 52 may transmit the response packet to the component (e.g., supervisory control system) via the Ethernet network 62. That is, since the response packet may be transmitted using the same type of communication network that the components use, the gateway communication device 52 may direct the response data packets directly from the one or more drives (e.g., without intervening component) to the components.

Figure 5:
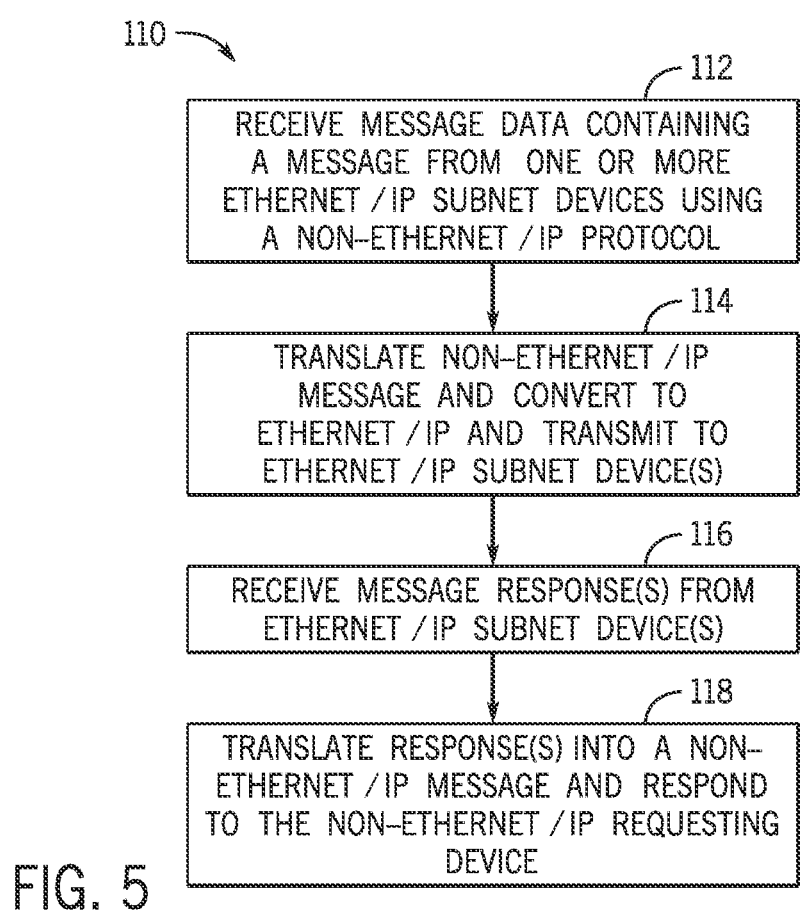
FIG. 5 is a flow chart of a process for communicating message data to and from the drives of the industrial automation system 10 via a gateway communication device, in accordance with an embodiment of the present disclosure.
Figure 6:
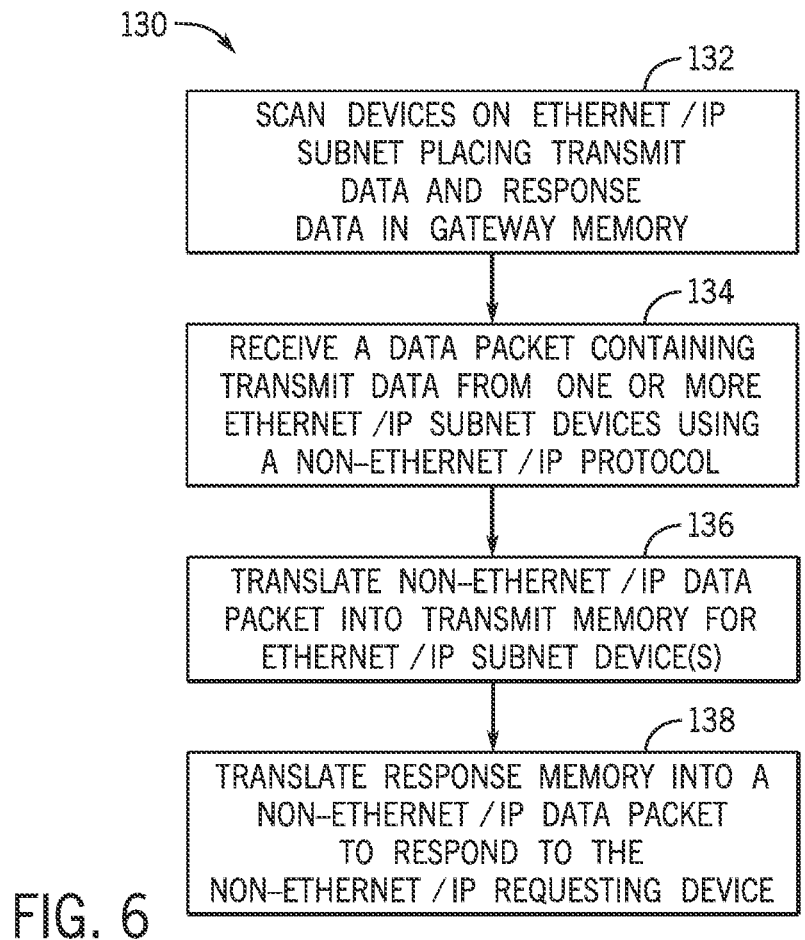
FIG. 6 is a flow chart of a process for communicating input/output (I/O) data to and from the drives of the industrial automation system 10 via a gateway communication device, in accordance with an embodiment of the present disclosure.

With the foregoing in mind, FIGS. 5 and 6 illustrate flow charts of processes employed by the gateway communication device 52 when performing scanning functions. That is, when the gateway communication device 52 may operate as a scanner or translator to facilitate data communication between devices on an EtherNet/IP subnet network and devices using a non-EtherNet/IP network. For example, the gateway communication device 52 may receive a data packet is in a format not compatible with the Ethernet/IP network (e.g., second subnet EtherNet/IP network), the gateway communication device 52 may perform a process 110 or a process 130 depending on whether the received data corresponds to message data or I/O data, respectively.

Referring first to FIG. 5, at block 112, the gateway communication device 52 may receive message data that may include a message for one or more devices (e.g., drives 54) that may be part of the subnet EtherNet/IP network accessible via the subnet ribbon cable 70. As such, the gateway communication device 52 may parse the message data to identify destination devices.

In some embodiments, the message data may be received from components that use a non-EtherNet/IP protocol that is not compatible with the subnet EtherNet/IP network. As such, at block 114, the gateway communication device 52 may translate the message data and convert it to a format that corresponds to the subnet EtherNet/IP network. The gateway communication device 52 may then transmit the translated message data to the destination devices via the subnet ribbon cable 70.

At block 116, the gateway communication device 52 may receive message responses from the devices (e.g., EtherNet/IP subnet devices) via the subnet ribbon cable 70. At block 118, the gateway communication device 52 may translate the message responses into a non-EtherNet/IP message that corresponds to the message data received at block 112. The gateway communication device 52 may then transmit the non-EtherNet/IP message to the device(s) that sent the message data. In this way, the gateway communication device 52 may facilitate communication between devices that are present on the subnet EtherNet/IP network and devices that are on a non-EtherNet/IP network.

With the foregoing in mind, FIG. 6 illustrates a flow chart of a process 130 employed by the gateway communication device 52 when performing scanning functions for I/O data. At block 132, the gateway communication device 52 may receive I/O data, which may consist of data from other I/O devices, requests for data from other I/O devices, or the like.

At block 132, the gateway communication device 52 may perform a scanning operation on devices (e.g., drives 54) accessible to the gateway communication device 52 via the subnet ribbon cable 70. That is, the gateway communication device 52 may periodically perform a a read operation or obtain a status update from devices that are part of the subnet EtherNet/IP network communicatively coupled to the gateway communication device 52. As such, the gateway communication device 52 may periodically update a table stored in the memory component accessible to the gateway communication device 52 based on the scanned data. In some embodiments, the gateway communication device 52 may scan devices on the subnet EtherNet/IP network and place transmit data (e.g., data to be transmitted) and response data (e.g., data received in response to status requests) in a memory component accessible to the gateway communication device 52. In this manner, the gateway communication device 52 may later retrieve the scanned data for each destination drive from the table stored in the memory component.

At block 136, the gateway communication device 52 may receive a data packet directed to one or more devices (e.g., drives 54) that are part of the subnet EtherNet/IP network. The data packet may be sent via a non-EtherNet/IP protocol. As such, the data packet may not be formatted in a manner that may be interpretable by the subnet devices or that may be transmitted via the subnet ribbon cable 70.

At block 136, the gateway communication device 52 may translate the data packet from the non-EtherNet/IP protocol and store the resulting translated data into the memory component. The translated data may be stored in a transmit memory that may be periodically scanned by the subnet devices.

At block 138, the gateway communication device 52 may translate responses stored in the memory component into a non-EtherNet/IP data packet, such that the non-EtherNet/IP data packet may be transmitted to the non-EtherNet/IP device that requested the response. The responses may be provided by the subnet devices and stored in the memory component. In this way, the gateway communication device 52 may facilitate scanning operations between non-EtherNet/IP devices and EtherNet/IP devices via the single pair Ethernet (SPE) conductors 56 of the subnet ribbon cable 70.

By performing the processes described above and employing the subnet as described above, the present embodiments described herein may allow multiple destination drives 54 to be communicatively coupled to the Ethernet network 62 while maintaining a high throughput and efficient transfer speeds. Moreover, the wiring involved between different drives 54 may be reduced as compared to routing Ethernet cables to each destination device 54. For instance, FIG. 6 is a schematic illustration of the control cabinet 50, in which the gateway communication device 52 and drives 54 and are connected to the Ethernet network 62 using the single pair Ethernet (SPE) conductors 56. The single pair Ethernet (SPE) conductors 56 eliminates the use of excessing wiring to connect each drive 54 to the Ethernet network 62. Using the single pair Ethernet (SPE) conductors 56 reduces overall cost and resource usage (e.g., simplifies wiring) associated with the control cabinet 50 compared to connecting each drive 54 to the Ethernet network 62 with a separate Ethernet cable.

Figure 7:
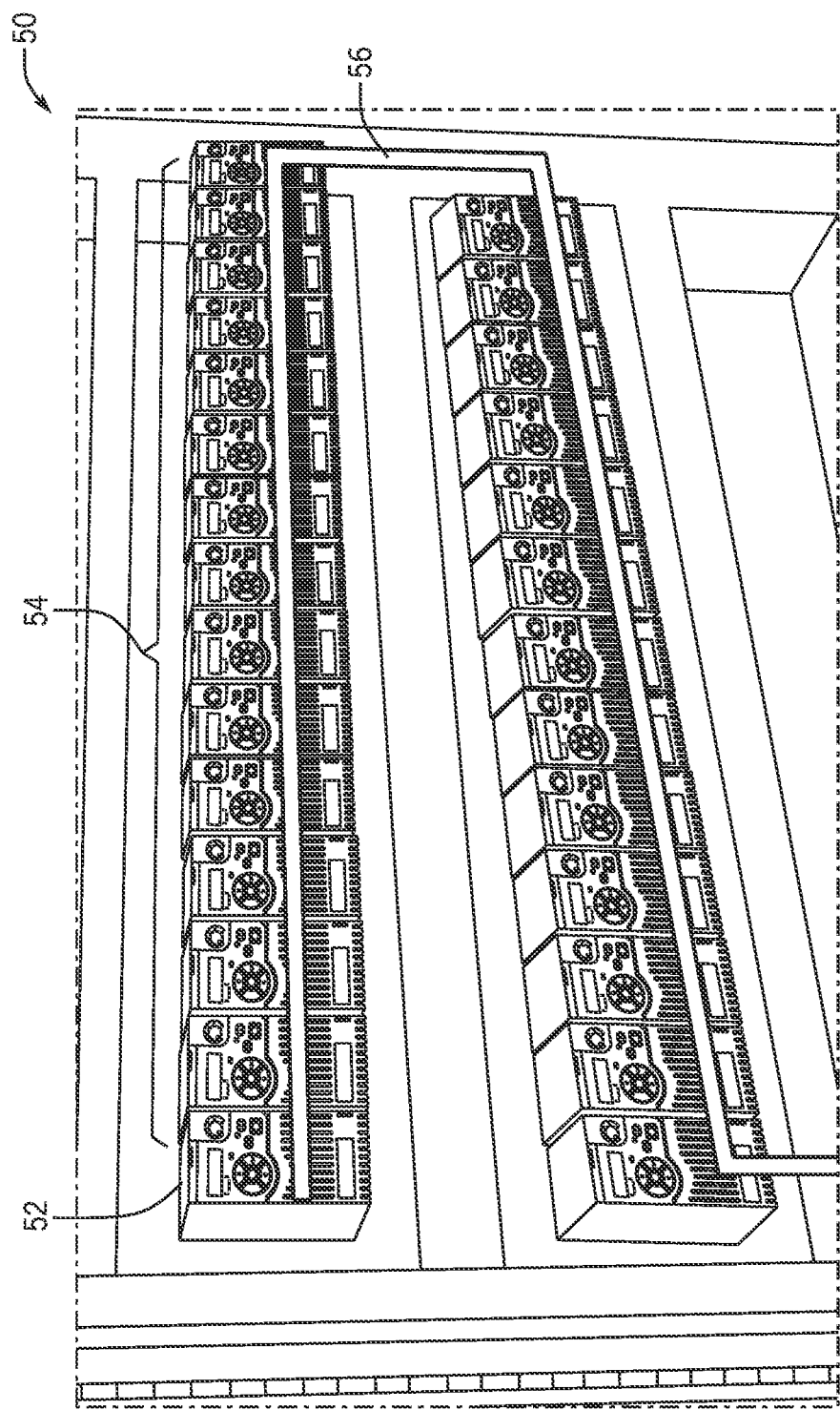
FIG. 7 is a schematic illustration of a control cabinet having the single pair Ethernet (SPE) cable of FIG. 4 coupled to drives, in accordance with an embodiment of the present disclosure.
Figure 8:
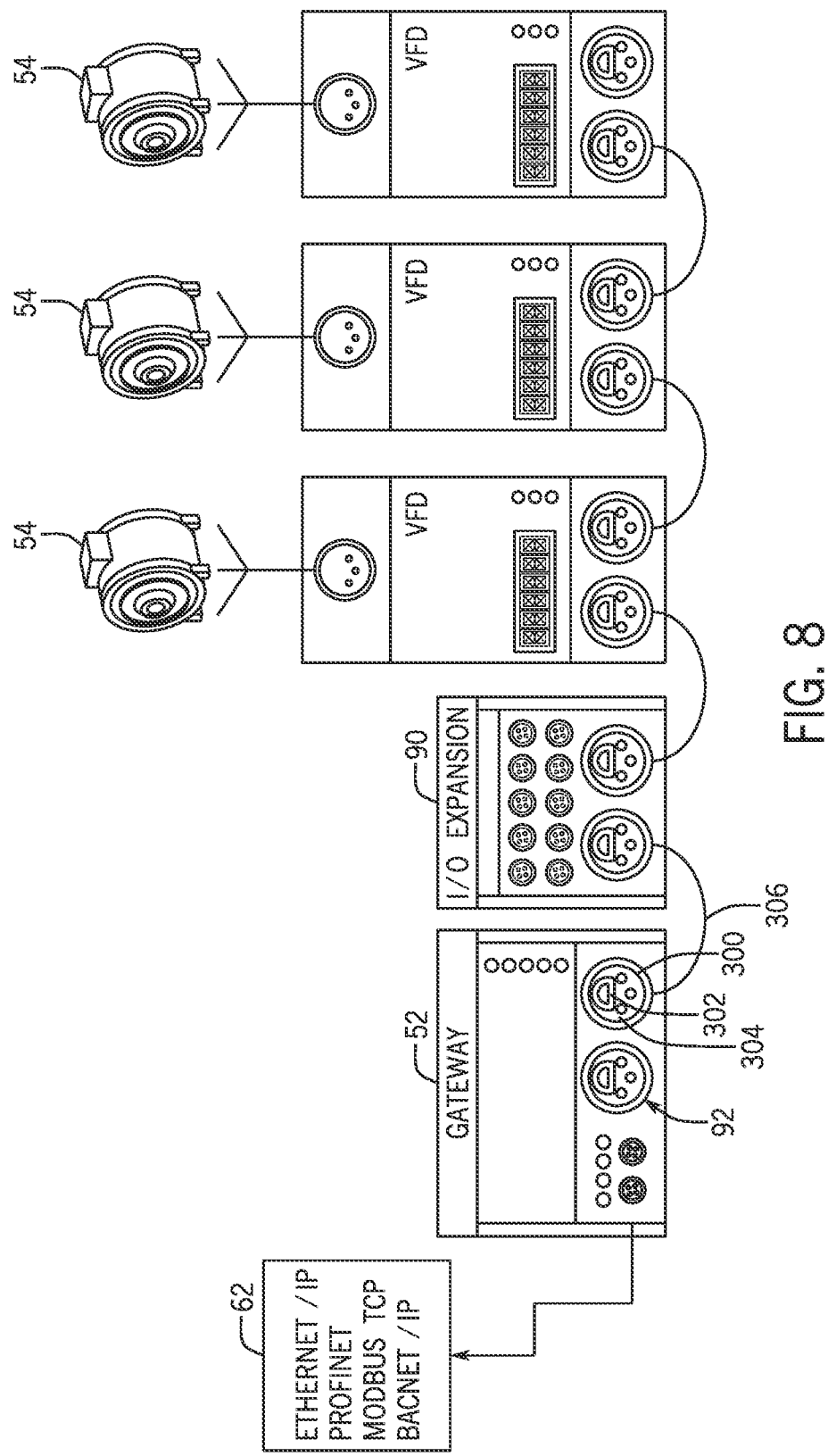
FIG. 8 illustrates an example of an on-machine interface application of a gateway communication device of the industrial automation system of FIG. 1, in accordance with an embodiment of the present disclosure.

As mentioned above, the gateway communication device 52 may be coupled to a power supply (e.g., three-phase power supply) 92. With this in mind, FIG. 7 illustrates the gateway communication device 52 having an interface 300 that may connect to the three-phase power supply 92 and the subnet ribbon cable 70, which may include the single pair Ethernet (SPE) conductors 56. That is, the interface 300 may include connector 302 that may connect to a cable that includes the subnet ribbon cable 70 and conductors for transmitting three-phase power. In some embodiments, the connector 302 may include, for example, eight pins to connect to the subnet ribbon cable 70 and three additional pins to connect to three conductors for distributing three-phase power. For instance, the interface 300 may include connector 304 to connect to the three-phase power supply 92. Using the interface 300, an integrated cable 306 may be used to connect to different devices (e.g., drives 54) to communicate via the embodiments described above while providing three-phase power to each of the connected devices. As mentioned above, the single pair Ethernet (SPE) conductors 56 help simplify wiring, reduce overall cost of the control cabinet 50 while increasing the number of drives that can be connected to the Ethernet network 62.

While only certain features of the disclosure have been illustrated and described herein, many modifications and changes will occur to those skilled in the art. It is, therefore, to be understood that the appended claims are intended to cover all such modifications and changes as fall within the true spirit of the present disclosure. The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . "or" step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
a plurality of drives configured to control one or more operations of a plurality of load devices; and
a gateway communication device configured to communicatively couple to:
the plurality of drives via a first communication network accessible via single pair Ethernet (SPE) conductors; and
one or more components accessible via a second communication network configured to communicate using a communication protocol different than the first communication network, wherein the gateway communication device is configured to:
periodically query the plurality of drives via the SPE conductors to retrieve and store one or more datasets in a memory component of the gateway communication device;
receive a data packet from the one or more components via the second communication network, wherein the data packet is incompatible with the first communication network, and wherein the data packet corresponds to a request for one or more data properties associated with one or more drives of the plurality of drives;
retrieve at least one of the one or more datasets via the memory component in response to determining that the one or more data properties are present in the one or more datasets;
retrieve the one or more data properties directly from the one or more drives via the SPE conductors in response to determining that the one or more data properties are not present in the one or more datasets;
generate an additional data packet based on the one or more data properties, wherein the additional data packet is configured to be transmitted via the communication protocol; and
transmit the additional data packet to the one or more components via the second communication network.

2. The system of claim 1, wherein the gateway communication device is configured to send a message to the one or more drives to retrieve the one or more data properties from the one or more drives in response to determining that the one or more data properties are not present in the one or more datasets and the data packet is associated with the second communication network.

3. The system of claim 1, wherein the gateway communication device is configured to identify the one or more drives of the plurality of drives based on sending a select signal via the single pair Ethernet (SPE) conductors to the one or more drives.

4. The system of claim 1, comprising one or more input/output devices configured to communicatively couple to the gateway communication device via the first communication network accessible via the single pair Ethernet (SPE) conductors.

5. The system of claim 1, wherein the gateway communication device comprises an interface configured to couple to a three-phase power source and the single pair Ethernet (SPE) conductors.

6. The system of claim 1, wherein the single pair Ethernet (SPE) conductors are disposed within a ribbon cable.

7. A system, comprising:
a plurality of drives configured to control one or more operations of a plurality of load devices; and
a gateway communication device configured to communicatively couple to:
the plurality of drives via a first communication network accessible via single pair Ethernet (SPE) conductors; and
one or more components accessible via a second communication network, configured to communicate using a communication protocol different than the first communication network, wherein the gateway communication device is configured to:
periodically query the plurality of drives via the SPE conductors to retrieve and store one or more datasets in a memory component part of the gateway communication device:
receive a data packet from the one or more components via the second communication network, wherein the data packet is incompatible with the first communication network, and wherein the data packet corresponds to a request for one or more data properties associated with one or more drives of the plurality of drives;
determine whether one or more data properties specified by the data packet and associated with the one or more drives are stored in a memory component;
retrieve at least one of the one or more datasets from the memory component in response to determining that the one or more data properties are stored in the memory component;
retrieve the one or more data properties directly from the one or more drives via the SPE conductors in response to determining that the one or more data properties are lacking in the one or more datasets;
generate an additional data packet based on the one or more data properties, wherein the additional data packet is configured to be transmitted via the communication protocol; and
transmit the additional data packet to the one or more components via the second communication network.

8. The system of claim 7, wherein the gateway communication device is configured to
receive an additional data packet from the one or more components via the second communication network, wherein the additional data packet is compatible with the first communication network; and
transmit the additional data packet to the one or more additional drives in response determining that the data packet is compatible with the first communication network.

9. The system of claim 7, wherein the single pair Ethernet (SPE) conductors are disposed within a ribbon cable.

10. The system of claim 9, wherein the ribbon cable comprises a select line conductor, two network power conductors, two control power conductors, and the single pair Ethernet (SPE) conductors.

11. The system of claim 7, comprising one or more additional components comprising a push button, a pilot light, a switch, a starter, a contactor, or any combination thereof, wherein the one or more additional components are configured to communicatively couple to the gateway communication device via the first communication network.

12. The system of claim 7, wherein the gateway communication device comprises an interface configured to couple to a three-phase power source and the single pair Ethernet (SPE) conductors.

13. The system of claim 12, wherein the plurality of drives comprises an additional interface configured to couple to an integrated cable, wherein the integrated cable is configured to receive three-phase power from the three-phase power source and single pair Ethernet (SPE) data from the single pair Ethernet (SPE) conductors.

14. The system of claim 7, wherein each of the plurality of drives comprises a switch configured to receive single pair Ethernet (SPE) data via the single pair Ethernet (SPE) conductors and forward the single pair Ethernet (SPE) data to another drive via additional single pair Ethernet (SPE) conductors.

15. The system of claim 7, wherein the plurality of drives and the gateway communication device are integrated together in a common housing.

16. A method, comprising:
periodically querying, via at least one processor, a plurality of drives via single pair Ethernet (SPE) conductors on a first communication network to retrieve and store one or more datasets in a memory component accessible by the at least one processor;
receiving, via at least one processor, a data packet from one or more components via a second communication network configured to communicate using a communication protocol different than the first communication network, wherein the data packet is incompatible with the first communication network, and wherein the data packet corresponds to a request for one or more data properties associated with one or more drives of the plurality of drives;

retrieving, via the at least one processor, at least one of the one or more datasets via the memory component in response to determining that the one or more data properties are present in the at least one of the one or more datasets retrieving, via the at least one processor, the one or more data properties directly from the one or more drives via the SPE conductors in response to determining that the one or more data properties are lacking in the one or more datasets;

generating, via the at least one processor, an additional data packet based on the one or more data properties, wherein the additional data packet is configured to be transmitted via the communication protocol; and transmitting, via the at least one processor, the additional data packet to the one or more components via the first communication network.

17. The method of claim 16, comprising:

receiving, via at least one processor, an additional data packet from the one or more components via the second communication network, wherein the additional data packet is compatible with the first communication network; and transmitting, via the at least one processor, the additional data packet to the one or more additional drives in response to determining that the additional data packet is compatible with the first communication network.

18. The method of claim 16, comprising periodically updating, via the at least one processor, the memory component to include scanned information for each of the plurality of drives acquired via the second communication network.

* * * * *